(12) United States Patent
Garnier et al.

(10) Patent No.: US 6,656,265 B1
(45) Date of Patent: Dec. 2, 2003

(54) CEMENTATION PRODUCT AND USE FOR CEMENTING OIL WELLS OR THE LIKE

(75) Inventors: André Garnier, Saint Cyr l'Ecole (FR); Michel Michaux, Verrieres le Buisson (FR); Philippe Revil, Abu Dhabi (AE)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 09/831,671
(22) PCT Filed: Nov. 13, 1999
(86) PCT No.: PCT/FR98/02429

§ 371 (c)(1),
(2), (4) Date: Jul. 17, 2001

(87) PCT Pub. No.: WO00/29351

PCT Pub. Date: May 25, 2000

(51) Int. Cl.$^7$ ................................................. C04B 7/02
(52) U.S. Cl. ........................ 106/713; 106/705; 106/724; 106/820; 106/DIG. 1
(58) Field of Search .................................. 106/705, 713, 106/724, 820, DIG. 1

(56) References Cited

U.S. PATENT DOCUMENTS

| | | | | |
|---|---|---|---|---|
| 3,902,911 A | * | 9/1975 | Messenger | |
| 4,002,482 A | * | 1/1977 | Coenen | |
| 4,234,344 A | * | 11/1980 | Tinsley et al. | |
| 4,252,193 A | * | 2/1981 | Powers et al. | |
| 4,305,758 A | * | 12/1981 | Powers et al. | |
| 4,370,166 A | * | 1/1983 | Powers et al. | |
| 4,933,031 A | * | 6/1990 | Blomberg et al. | .......... 106/679 |
| 5,783,297 A | * | 7/1998 | Wise et al. | |

* cited by examiner

*Primary Examiner*—Paul Marcantoni
(74) *Attorney, Agent, or Firm*—Catherine Menes; Thomas O. Mitchell; Brigitte Jeffery

(57) ABSTRACT

The present invention provides a cementing composition for an oil well or the like with porosity of less than 50%, and with a solid phase constituted by 35% to 65% (by volume) hollow microspheres, 20% to 45% Class G Portland cement, and 5% to 25% of Class G Portland micro-cement. The invention is used to cement conductor pipes in arctic zones or in deep water holes.

16 Claims, No Drawings

CEMENTATION PRODUCT AND USE FOR CEMENTING OIL WELLS OR THE LIKE

The present invention relates to techniques for drilling oil, gas, water, or geothermal wells or the like. More precisely, the invention relates to cementing compositions, more particularly to those adapted to low temperatures.

After drilling an oil well or the like, a casing or liner is lowered into the hole and cemented over all or a part of its depth. Cementing is intended to fix the casing and also to prevent fluid being exchanged between the various formation layers traversed by the hole, to prevent gas from rising via the annular space surrounding the casing, and to limit the ingress of water into the production well. The cementing operation consists of injecting a cement slurry via the interior of the casing, and displacing it by means of another fluid, generally a drilling mud. When it reaches the bottom of the hole, the slurry is constrained to rise via the annular space between the wall of the hole and the casing. After positioning, the mechanical strength of the hardened cement increases to reach a maximum after about ten days. However, drilling can be resumed as soon as the compressive strength reaches 3.44 MPa (500 psi); in practice, then, it is desirable to have compositions with a short Waiting On Cement, i.e., a short period that elapses between pumping and the time by which the cement has developed sufficient strength to support the conductor pipe.

In the particular case of offshore drilling, special care must be taken with the first portion of the casing, known as the conductor pipe, which acts as a guide for subsequent drilling and as a result must be particularly precisely orientated. The conductor pipe is located a short distance beneath the sea bed, at a temperature typically of the order of 4° C., while the slurry is prepared on the surface, at a temperature which can be close to the temperature of the well (in the case of a North Sea well, for example), but it can also be much higher since deepwater wells are often located in tropical or equatorial zones (in particular the Gulf of Mexico and West Africa). This constitutes a very particular case since when cementing the vast majority of oil wells, the cement slurry heats up as it descends in the well.

A cement sets more slowly at lower temperatures. At a few degrees above zero, an ordinary cement will set only after several days have elapsed during which period the platform is immobilized and drilling cannot be resumed. Further, the conductor pipe is raised before the cementing operation and is held temporarily in a winch until the cement is sufficiently strong for it act as a support. The longer this stage, the more difficult it is to prevent the conductor pipe from deviating from its desired orientation.

Various additives aimed at accelerating setting are known, but such extreme conditions are beyond their capabilities and the quality of the cement slurry and the hardened cement is severely affected. Formulations have thus been developed which are based on specific cements. They are essentially divided into two classes: formulations based on plaster and formulations based on aluminous cements. Formulations based on plaster, or more exactly a plaster/Portland cement mixture, are generally intended particularly for logistical purposes; the performance of aluminous cements is severely affected when contaminated with Portland cements and they must therefore be stored in separate silos.

In addition, the sea bed is often sandy, with poor consolidation. Thus low density cement slurries must be used, with a density generally in the range 11 pounds per gallon (ppg) to 13 ppg, (i.e., 1.32 g/cm$^3$ to 1.56 g/cm$^3$). In general, a cement slurry is lightened by increasing the quantity of water and—to avoid the liquid and solid phases separating—by adding compounds such as bentonite or sodium silicate to form gels. While the water/solids weight ratio for an ordinary cement is normally in the range 38% to 46%, that for a slurry of such low density is routinely greater than 50%, or even greater than 60%. Such quantities of water retard the development of compressive strength and thus prolong the Waiting On Cement.

A slurry can also be lightened by adding light materials such as silica dust (French patent FR-A-2 463 104) or hollow ceramic or glass beads (United States patents U.S. Pat. No. 3,804,058; U.S. Pat. No. 3,902,911 or U.S. Pat. No. 4,252,193). Such materials can reduce but not dispense with the quantity of additional water added to the cement slurry to lighten it such that the compressive strength development is less retarded. The quantity of water required remains high and after 24 hours, the compressive strength remains very low, generally not exceeding 600 psi (4136 kPa).

A slurry can also be lightened by injecting gas or air. T. Smith, R. Lukay and J. Delorey, in World Oil, May 1984, proposed the use of such foamed cements to cement conductor pipes in deep water holes. U.S. Pat. No. 5,484,019 also discloses the use, as a base for such foamed cements, of a slurry comprising 1% to 30% of micro-cement. The principal aim of U.S. Pat. No. 5,484,019 is to provide a slurry which is capable of rapidly forming a gel which is sufficiently strong to prevent the ingress of water, not to provide a rapid set slurry, in particular from the point of view of developing compressive strength.

In any comparison with existing systems, it is important to note that the temperature of sea beds depends both on their depth and on their location. Thus while the temperature off the Shetland Isles is no more than 5° C. from a depth of 500 meters, at the same depth off Malaysia it is about 10° C., and 5° C. is only reached at a depth of 1000 meters. Further, the temperature of the cement slurry depends on the temperature of the sea bottom and on the existence of submarine currents. In a warm region of the planet, with few currents, in practice the slurry temperature can be as much as 15° C. even when the sea bed is at 4° C. In contrast, in a cold region subjected to substantial currents, the slurry temperature can be almost identical to the water temperature. In the oil well industry, any operation at a temperature of less than 30° C. is a termed a low temperature application. The present invention is aimed at applications at temperatures which are more particularly in the range 4° C. to 10° C.

The present invention aims to provide novel low density and very low temperature cementing formulations which can develop compressive strength rapidly.

The invention provides cementing compositions with a porosity of less than 50% and with a solid phase constituted by 35% to 65% (by volume) of hollow microspheres, 20% to 45% of Class G Portland cement and 5% to 25% of Class G Portland micro-cement. The term "porosity" means the ratio of the volume of liquid in the slurry to the total slurry volume.

The micro-cement used for the compositions of the invention is an essentially pure micro-cement, i.e., constituted by more than 90% Class G Portland cement. Micro-cements with a maximum particle size in the range 6 μm to 12 μm, preferably 8 μm to 11 μm, are particularly preferred.

The microspheres used in the invention have low density, preferably less than 0.8. Silico-aluminate or cenospheres, a residue obtained from coal combustion, with an average diameter of the order of 150 μm, are particularly suitable. Hollow glass beads with an average diameter of 120 μm to 250 μm are also suitable.

In general, a dispersing agent is added to the composition as well as a cement-setting accelerator. Known dispersing agents generally have a retarding effect on cement setting which must be compensated for. Other conventional additives can be added, in particular anti-foaming agents, fluid loss control agents or gas migration control agents. The composition of the invention can also comprise a cement-setting accelerator, in particular calcium chloride, in an amount not exceeding 2%, preferably 1.5% (percentage by weight with respect to the weight of the solid cement/micro-cement/micro-sphere mixture); adding calcium chloride has a deleterious effect on the rheology of a slurry which increases the quantity of dispersing agent which cancels out the effect of the cement-setting accelerator.

Preferably, the solid particles of the mixture are in respective proportions such that the compactness of the mixture is close to its maximum value. Adding fine particles can thus produce a PVF (Packing Volume Fraction) which is preferably more than 0.75 and more preferably more than 0.8. In this way, mixing the formulation causes no particular problems even with porosities as low as in the case of the invention. Further, very satisfactory rheologies are obtained which are favorable to good pumping conditions in particular with an almost complete absence of sedimentation.

Other advantageous details and characteristics of the invention become apparent from the description below of tests carried out on different examples of additive compositions.

CHARACTERISTICS OF MICRO-CEMENTS

The majority of oil industry applications using a micro-cement use compounds formed from slag which comprises 45% lime, 30% silica, 10% alumina, 1% iron oxides, and 5–6% manganese oxide (only the principal oxides are mentioned here; these amounts can, of course, vary slightly depending on the supplier). This type of micro-cement is termed "micro-slag" below.

Class G Portland cement typically comprises about 65% lime, 22% silica, 4% alumina, 4% iron oxides, and less than 1% manganese oxide. Of course, the formulations vary depending on the supplier but the lime/silica ratio is of the order of 3 which is not the case with micro-slag; further, the alumina content of Class G Portland cement is about half that of micro-slag. Micro-cement formed from Class G Portland cement will hereinafter be termed micro-cement G.

The two types of micro-cement tested had very similar granulometric characteristics, with a median particle diameter of about 4 $\mu$m, a limiting particle size of 12 $\mu$m for the micro-slag and 11 $\mu$m for the micro-cement G and a specific surface area per unit mass determined by the air permeability test [Blair Fineness: 0.8000 m$^2$/g].

The two micro-cements were tested at low (10° C.) and very low (4° C.) temperatures. For each slurry tested, it was initially checked that the system could be pumped on the surface and injected into the well, a criterion which is considered to be satisfactory when the rheology of the slurry, at laboratory temperature and at 10° C., is such that the plastic viscosity of the slurry is less than 250 mPa.s and its yield point is in the range 0 to 9.5 Pa, preferably in the range 0 to 7 Pa.

For these systems deemed to be "pumpable", the development of compressive strength during cement hardening was evaluated by ultrasound ("Ultrasonic Cement Analyzer"), the temperature of the measuring cell being controlled using a cooling circuit constituted by a coiled tube in which a water/anti-freeze mixture circulated, cooled by a cryostat. Those measurements served to determine the setting time required to obtain a given strength, and also the compressive strength Rt obtained after a given time (24 or 48 hours) at a pressure of 3000 psi (20.7 MPa).

Further, for these "pumpable" systems, the thickening time TT was measured, which was a measure of the cement pumpability period for those tests and corresponded to the period required to develop a consistency of 100 Bc (dimensionless Bearden units); this measure was made, unless otherwise indicated, at a pressure of 1000 psi (6.9 MPa). In general, a system was satisfactory if the thickening time was in the range 3 hours to 6 hours. Tests carried out at other pressures (between 3.4 MPa and 13.8 MPa) have shown that the result varied little as a function of the pressure variations.

EXAMPLE 1

MICRO-SLAG IN FRESH WATER

A series of slurries was prepared with a solid cement/cenospheres/micro-slag mixture, in the proportion 35:55:10 by volume. The slurry porosity was fixed at 42%. The mixing water was a mixture of tap water, 2.5 liters of an anti-foaming agent per ton of solid cement/cenospheres/micro-cement and a variety of additives shown in the Table below in which the quantities indicated for the dispersing agent, the fluid loss control agent and the sodium silicate (accelerator) are in liters per ton of solid cement/cenospheres/micro-cement mixture. Certain compositions comprised calcium chloride as an accelerator (the percentage shown was then a percentage by weight of the solid cement/cenospheres/micro-cement mixture).

The fluid loss control agent used here was an additive which was particularly suitable for low temperature cementing, in this case a suspension of a micro-gel obtained by chemically cross-linking a polyvinyl alcohol, by reacting the polyvinyl alcohol in solution with glutaraldehyde at a pH in the range 2 to 3, the molar concentration of the cross-linking agent with respect to the monomeric PVA moieties being in the range about 0.1% to 0.5% in the presence of 3.5% of polyvinylpyrrolidone. This additive has been described in detail in French patent application FR-A-2 759 364 the contents of which are hereby incorporated by reference.

The dispersing agent was a sulfonated formaldehyde-melamine condensate, a dispersing agent known for its low retarding effect on setting time.

The slurry rheology was measured at laboratory temperature (rheology after mixing) or after 10 minutes of conditioning at 10° C.

The Table below shows that for a given slurry, the setting time could double when the temperature was lowered from 10° C. to 4° C. The dispersing agent had a very large retarding effect at very low temperature, which effect was not observed at 10° C.: thus the increase in the quantity of calcium chloride (tests #4 and #5) was without effect at 4° C. because of the increase in the quantity of dispersing agent (for those tests, similar slurry rheologies were sought, although the calcium chloride had a viscosifying effect which had to be compensated for by increasing the dispersing agent).

|  | #1 | #2 | #3 | #4 | #5 |
|---|---|---|---|---|---|
| Density (g/cm$^3$) | 1.47 | 1.47 | 1.47 | 1.48 | 1.48 |
| Dispersing agent (l/t) | 6.67 | 8.35 | 8.35 | 11.69 | 13.35 |
| Fluid loss control agent (l/t) | 50.07 | 50.07 | 50.07 | 50.07 | 50.07 |
| Sodium silicate (l/t) | 8.35 | 12.52 | 16.69 | — | — |
| Calcium chloride (%) | — | — | — | 1.25 | 2 |
| After mixing: Yield point (Pa) | 1.9 | 2.5 | 2.9 | 9.6 | 5.1 |
| Plastic viscosity (mPa.s) | 122 | 131 | 131 | 116 | 105 |
| At 10° C.: Yield point (Pa) | 1.0 | 3.1 | 9.0 | 12.2 | 11.8 |
| Plastic viscosity (mPa.s) | 208 | 191 | 193 | 171 | 181 |
| TT at 10° C. | 8:24 | 9:39 | 8:17 | 6:35 | 5:55 |
| TT at 25° C. | 4:34 | 3:50 | 4:26 | 4:27 | 2:48 |
| SETTING at 10° C.: time to: |  |  |  |  |  |
| 0.35 MPa [50 psi] (hr:min) | 14:00 | 17:53 | 16:38 | 12:16 | 9:16 |
| 3.45 MPa [500 psi] (hr:min) | 20:00 | 25:37 | 24:21 | 17:31 | 14:51 |
| Rt after 24 hr (MPa) |  |  |  | 7.6 | 6.9 |
| Rt after 48 hr (MPa) | 12.4 | 14.1 | 17.3 | 18.5 | 13.1 |
| SETTING at 4° C.: time to: |  |  |  |  |  |
| 0.35 MPa [50 psi] (hr:min) | 26:58 | 22:00 | 28:44 | 16:56 | 16:08 |
| 3.45 MPa [500 psi] (hr:min) | 39.33 | 28:30 | 45:04 | 30:37 | 24:27 |
| Rt after 48 hr (MPa) | 5.9 | 12.1 | 4.1 | 6.2 | 10.7 |

EXAMPLE 2

MICRO-SLAG IN SEA WATER

The solid mixture used in Example 1 was used, with the same porosity but using sea water as the mixing water.

|  | #6 | #7 | #8 | #9 | #10 |
|---|---|---|---|---|---|
| Density (g/cm$^3$) | 1.477 | 1.477 | 1.477 | 1.477 | 1.474 |
| Dispersing agent (l/t) | 19.20 | 19.20 | 14.19 | 14.19 | 8.34 |
| Fluid loss control agent (l/t) | 25.0 | 16.69 | 16.69 | 8.34 | 41.73 |
| After mixing Yield point (Pa) | 0.5 | −4.9 | 4 | 5 | 25 |
| Plastic viscosity (mPa.s) | 114 | 148 | 123 | 115 | 181 |
| 10° C. Yield point (Pa) | 0.5 |  | 5 | 7 | 29 |
| Plastic viscosity (mPa.s) | 205 |  | 206 | 197 | 284 |
| TT at 10° C., 6.9 MPa | >10:0 |  | 10:00 | 11:15 |  |
| SETTING at 10° C.: |  |  |  |  |  |
| 0.35 MPa (hr:min) |  |  |  | 16:49 |  |
| 3.45 MPa (hr:min) |  |  |  | 22:08 |  |
| Rt after 24 hr (MPa) |  |  |  | 4 |  |

|  | #11 | #12 | #13 |
|---|---|---|---|
| Density (g/cm$^3$) | 1.479 | 1.485 | 1.489 |
| Dispersing agent (l/t) | 8.34 | 8.34 | 15.0 |
| Fluid loss control agent (l/t) | 41.73 | 41.73 | 50.07 |
| Calcium chloride (%) | 0.5 | 1 | 1.25 |
| Rheology after mixing at 25° C. |  |  |  |
| Yield point (Pa) | 30 | 31 | 11 |
| Plastic viscosity (mPa.s) | 180 | 285 | 140 |
| Rheology at 10° C. |  |  |  |
| Yield point (Pa) |  |  | 14 |
| Plastic viscosity (mPa.s) |  |  | 233 |
| TT at 10° C., 6.9 MPa |  |  | 11:04 |

With sea water, satisfactory rheology was only obtained by greatly increasing the quantities of dispersing agent and the amount of agent required was higher as the quantity of fluid loss control agent was increased. The retarding effect observed with the slurries prepared with tap water was still further reinforced, such that the thickening time for some of the "pumpable" slurries was too long and, naturally, accompanied by very slow development of compressive strength, as shown by test #9.

As for the sea water tests, the viscosifying effect supplied by the calcium chloride was observed again, meaning that the quantity of dispersing agent had to be increased, practically canceling out the accelerating effect of the calcium chloride.

EXAMPLE 3

MICRO-CEMENT G IN SEA WATER

The solid mixture used in Example 1 was used, with the same porosity but using sea water as the mixing water.

|  | #14 | #15 | #16 | #17 | #18 |
|---|---|---|---|---|---|
| Density (g/cm$^3$) | 1.48 | 1.48 | 1.48 | 1.48 | 1.48 |
| Dispersing agent (l/t) | 12.52 | 16.69 | 19.2 | 20.86 | 20.86 |
| Fluid loss control agent (l/t) | 50.07 | 50.07 | 50.07 | 25.0 | 8.35 |
| After mixing Yield point (Pa) | 57.4 | 16.0 | 3.5 | 6.8 | 7.6 |
| Plastic viscosity (mPa.s) | 227 | 167 | 88 | 117 | 112 |
| 10° C. Yield point (Pa) | 67.8 | 28.7 | 4.5 | 7.3 | 8.4 |
| Plastic viscosity (mPa.s) | 381 | 275 | 161 | 197 | 174 |
| TT at 10° C., 6.9 MPa |  |  | 5:57 | ≈5:00 | 3:45 |
| SETTING at 10° C.: |  |  |  |  |  |
| 0.35 MPa (hr:min) |  |  | 13:49 | n.m | 11:43 |
| 3.45 MPa (hr:min) |  |  | 16:58 | n.m | 14:23 |
| Rt after 24 hr (MPa) |  |  | 12.4 | n.m | 12.1 |
| Rt after 48 hr (MPa) |  |  | 25.4 | n.m | 14.7 |
| SETTING at 4° C.: |  |  |  |  |  |
| 0.35 MPa (hr:min) |  |  | 20:58 | n.m | 20:32 |
| 3.45 MPa (hr:min) |  |  | 25:46 | n.m | 25:50 |
| Rt after 48 hr (MPa) |  |  | 17.8 | n.m | 14.5 |

Setting at 10° C. and 4° C. was not studied in detail for slurry #17. However, this slurry satisfied the criteria of the invention and the setting time and compressive strength were estimated to be intermediate between the values measured for slurries #16 and #18.

Replacing the micro-slag with class G micro-cement enabled slurries to be prepared with sea water which developed remarkably high compressive strengths at low and very low temperatures.

EXAMPLE 4

MICRO-CEMENT G IN FRESH WATER

The two examples below demonstrate that Portland class G cement can also be used in fresh water, even in the absence of a specific cement-setting accelerator.

|                              | #19   | #20   |
|------------------------------|-------|-------|
| Density (g/cm³)              | 1.47  | 1.47  |
| Dispersing agent (l/t)       | 14.19 | 14.19 |
| Fluid loss control agent (l/t)| 8.35 | 50.07 |
| After mixing Yield point (Pa)| 2.7   | 7.7   |
| Plastic viscosity (mPa.s)    | 123   | 123   |
| TT at 10° C., 6.9 MPa        | 4:35  | 5:42  |
| SETTING at 10° C.:           |       |       |
| 0.35 MPa (hr:min)            | 12:00 | 14:48 |
| 3.45 MPa (hr:min)            | 16:30 | 19:11 |
| Rt after 24 hr (MPa)         | 7.72  | 6.2   |
| Rt after 48 hr (MPa)         | —     | 18.7  |
| SETTING at 4° C.:            |       |       |
| 0.35 MPa (hr:min)            |       | 25:26 |
| 3.45 MPa (hr:min)            |       | 31:50 |
| Rt after 48 hr (MPa)         |       | 10.3  |

EXAMPLE 5

Portland cement is divided into 8 categories, A to H, depending on the depth, temperature and pressure to which they are exposed. Classes A, B and C are particularly intended for low temperature applications. Class C cement is considered to be particularly suitable for applications necessitating rapid compressive strength development and thus appears to be an excellent candidate for very low temperature applications. Class G Portland cement is the most routinely used cement for medium temperature applications (typically of the order of 60° C.).

Three cement slurries were prepared with class A, C and G Portland cement. The rheological properties and the setting characteristics were measured.

| Cement class | A | C | G |
|---|---|---|---|
| Rheology after mixing at 25° C. | | | |
| Yield point (Pa) | 20.2 | 46.1 | 9.7 |
| Plastic viscosity (mPa.s) | 269 | 586 | 184 |
| Thickening time at 25° C. | 4:36 | 2:28 | 6:10 |
| SETTING at 4° C.: Time to: | | | |
| →0.35 MPa [50 psi] (hr:min) | 11:00 | | 19:30 |
| →3.45 MPa [500 psi] (hr:min) | 19:47 | — | 24:11 |
| Compressive strength after 48 hr (MPa) | 2077 | — | 2680 |

The best rheology was shown by the slurry prepared with the class G cement. With the class C cement, too viscous a slurry was obtained with too high a yield point. With class A cement, the rheology was less satisfactory, and on the limits of acceptability but the transition time (from 50 to 500 psi) was close to nine hours Further, the thickening time at ambient temperature was only slightly more than 4 hours, which could cause problems if the pumping operation was held up for any particular reason. It should also be noted that the cement was poorly dispersed and there were problems with free water formation in the slurry. The class G cement had a transition time of less than 5 hours and produced a better compressive strength after 48 hours.

EXAMPLE 6

For these tests, carried out with fresh water, the micro-cement G used above was replaced with other micro-cements based on finer class G Portland micro-cement, with a maximum particle size of 8 μm and 6 μm respectively.

|                              | 8μ    | 6μ    |
|------------------------------|-------|-------|
| Dispersing agent (l/t)       | 14.19 | 14.19 |
| Fluid loss control agent (l/t)| 50.07| 50.07 |
| After mixing Yield point (Pa)| 1.6   | 10.3  |
| Plastic viscosity (mPa.s)    | 126   | 143   |
| TT at 10° C., 6.9MPa         | 7:47  | 6:53  |
| SETTING at 10° C.:           |       |       |
| 0.35 MPa (hr:min)            | 19:27 | 13:00 |
| 3.45 MPa (hr:min)            | 24:38 | 16:11 |
| Rt after 24 hr (MPa)         | 3.4   | 15.1  |
| Rt after 48 hr (MPa)         | 15.4  | 28.3  |
| SETTING at 4° C.:            |       |       |
| 0.35 MPa (hr:min)            | 18:54 | 24:10 |
| 3.45 MPa (hr:min)            | 25:05 | 30:13 |
| Rt after 48 hr (MPa)         | 20.0  | 12.07 |

A class G portland type micro-cement finer than the micro-cement used above could be profitably used, however choosing a very fine cement caused an increase in the rheology of the slurry over micro-cements with a maximum particle size in the range 7 μm to 12 μm.

What is claimed is:

1. A well cementing composition, comprising a slurry of:
   i) a solid phase comprising 35% to 65% by volume hollow microspheres, 20% to 45% by volume Class G Portland cement, and 5% to 25% by volume Class G Portland micro-cement; and
   ii) water in an amount such that the porosity, being calculated as the ratio of the volume of liquid to the total volume of slurry, is less than 50%.

2. A cementing composition according to claim 1, characterized in that the maximum particle size of the class G Portland type micro-cement is in the range 6 μm to 12 μm.

3. A cementing composition according to claim 1, characterized in that the mixing water is sea water.

4. Cementing composition according to claim 2, characterized in that the mixing water is sea water.

5. A cementing composition according to claim 1, characterized in that it also contains a dispersing agent.

6. A cementing composition according to claim 2, characterized in that it also contains a dispersing agent.

7. A cementing composition according to claim 3, characterized in that it also contains a dispersing agent.

8. A cementing composition according to claim 1, characterized in that it also contains a fluid loss control agent.

9. A cementing composition according to claim 2, characterized in that it also contains a fluid loss control agent.

10. A cementing composition according to claim 3, characterized in that it also contains a fluid loss control agent.

11. A cementing composition according to claim 5, characterized in that it also contains a fluid loss control agent.

12. A cementing composition according to claim 1, characterized in that it also contains a cement-setting accelerator.

13. A cementing composition according to claim 2, characterized in that it also contains a cement-setting accelerator.

14. A cementing composition according to claim 3, characterized in that it also contains a cement-setting accelerator.

15. A cementing composition according to claim 5, characterized in that it also contains a cement-setting accelerator.

16. A cementing composition according to claim 8, characterized in that it also contains a cement-setting accelerator.

* * * * *